United States Patent [19]

Kouyama et al.

[11] 4,280,582
[45] Jul. 28, 1981

[54] VEHICLE FRAME ARRANGEMENT IN MOTORIZED TWO-WHEELED VEHICLE

[75] Inventors: Mikihiro Kouyama; Katsunori Funabashi, both of Kawagoe, Japan

[73] Assignee: Honda Giken Kogyo Kabushiki Kaisha, Tokyo, Japan

[21] Appl. No.: 51,518

[22] Filed: Jun. 22, 1979

Related U.S. Application Data

[63] Continuation of Ser. No. 844,263, Oct. 21, 1977.

[30] Foreign Application Priority Data

Nov. 1, 1976 [JP] Japan ............................ 51-145788
Nov. 4, 1976 [JP] Japan ............................ 51-147217

[51] Int. Cl.³ ............................................. B60H 3/06
[52] U.S. Cl. ............................... 180/219; 55/385 B; 55/DIG. 28; 280/281 R; 180/225
[58] Field of Search ................... 180/225, 219; 280/281 R, 283; 55/385 B, DIG. 28

[56] References Cited

U.S. PATENT DOCUMENTS 2,329,248  9/1943  Carlson ............................. 180/225
3,698,503  10/1972  Koyama ............................ 180/219

FOREIGN PATENT DOCUMENTS 533097    5/1955  Belgium .
1062854   4/1954  France .
1110682   2/1956  France .
1112017   3/1956  France .
46-3692   of 1971  Japan .

Primary Examiner—John P. Silverstrim
Attorney, Agent, or Firm—Haseltine and Lake

[57] ABSTRACT

A frame for a motorcycle is disclosed of the type including a main frame which extends rearwardly and downwardly from the journal for the steerable front wheel, and, which at its lower end is rigidly attached to a casing of the drive motor. In order to provide space for accommodating an air filter and ancilliary equipment, a pair of subsidiary tubes are rigidly attached to an upper portion of the main frame, the subsidiary tubes respectively diverging outwardly from the main frame and then extending rearwardly and downwardly to a rigid attachment with a transverse tubular member which is rigidly attached to a rear lower end of the main frame, the attachment of the subsidiary tubes to the tubular member being at positions spaced outwardly of the main frame.

1 Claim, 8 Drawing Figures

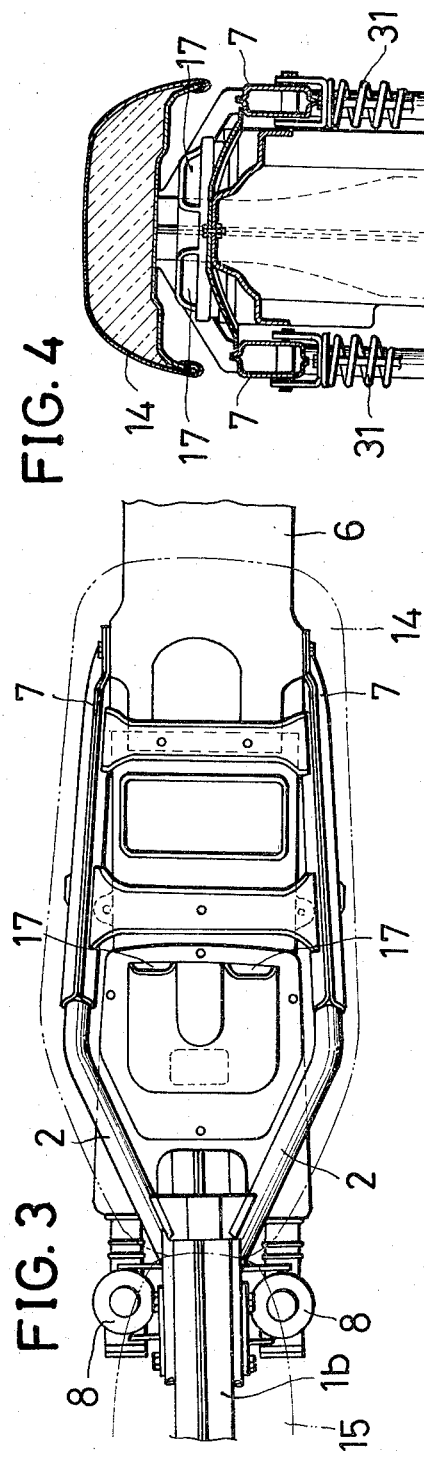
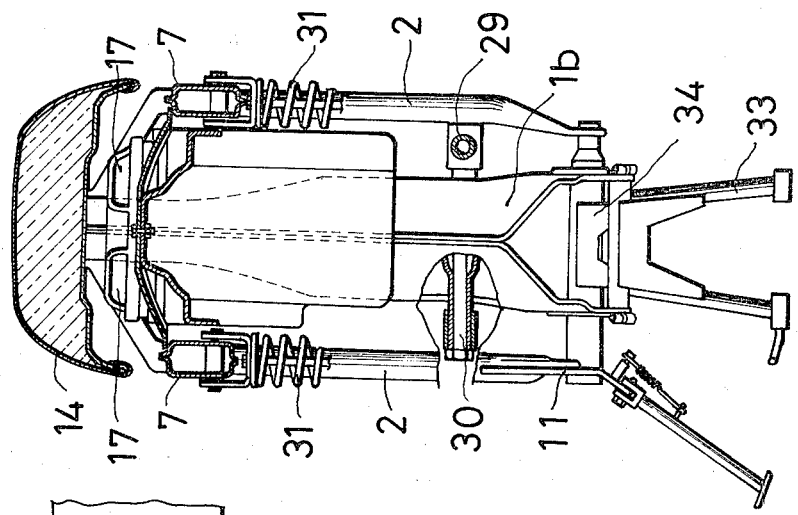
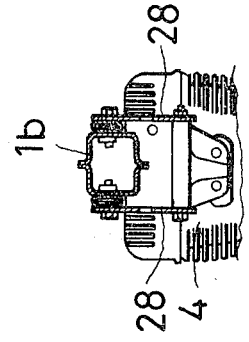
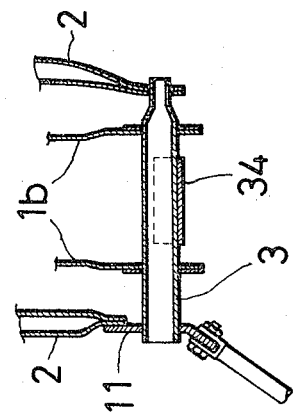
FIG. 3
FIG. 4
FIG. 5
FIG. 6

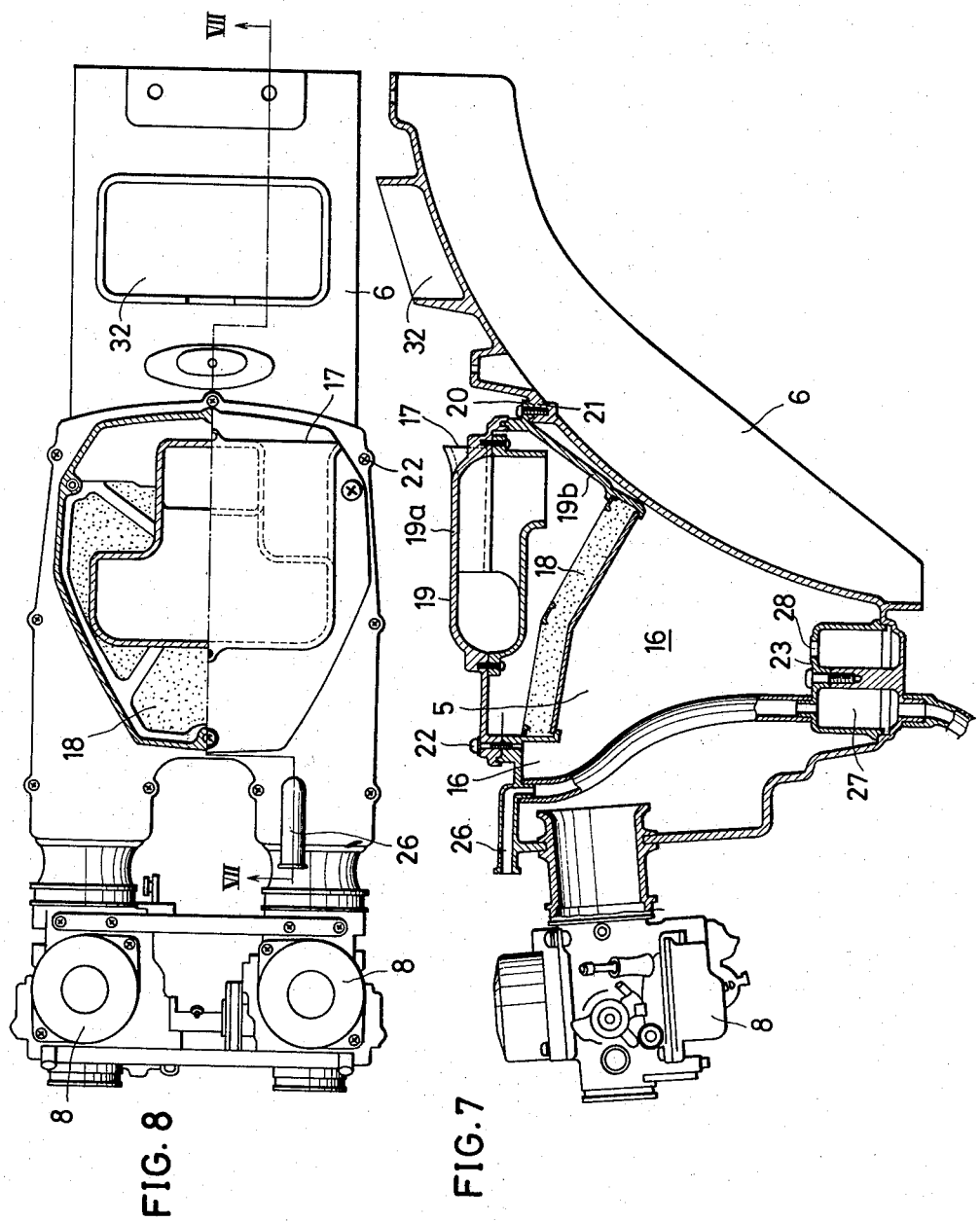

VEHICLE FRAME ARRANGEMENT IN MOTORIZED TWO-WHEELED VEHICLE

This is a continuation of application Ser. No. 844,263 filed Oct. 21, 1977.

BACKGROUND OF THE INVENTION

The present invention relates to a vehicle frame arrangement for a motorized two-wheeled vehicle such as a motorcycle or the like.

There has been hitherto known arrangements of the type shown in FIG. 1. For instance, a vehicle frame main body a of diamond frame type or the like, is provided on its both side surfaces with a pair of subsidiary tubes b,b bent to project rearwards therefrom. It is usual that, to increase rigidity especially in the case of a diamond frame, the upper end and the lower end of each tube b are put on the side surface of the main body a and secured thereto by welding or the like. Such a conventional arrangement causes defects, more particularly a space formed between the two tubes b,b is comparatively small in width, and thus it is difficult to obtain a space large enough to accommodate various parts such as an air cleaner casing, a battery box and others. Additionally, it causes trouble due to the need of a driving chain between an internal combustion engine on the front side and a wheel on the rear side.

SUMMARY OF THE INVENTION

This invention has for its object to provide an arrangement free from the foregoing defects.

Another object is to provide a vehicle frame employing the inventive structure with a space formed between the subsidiary tubes.

Still a further object of the present invention is to provide an arrangement for readily attaching and maintaining an air cleaner to a casing and rear fender between the space between the subsidiary tubes.

The principal features of the present invention is directed to a vehicle frame apparatus for a motorized two-wheeled vehicle utilizing a vehicle frame main body having a pair of subsidiary tubes on both its side surfaces bent to project rearwards therefrom, wherein: the vehicle frame main body is provided at its rear and lower end portions with a shaft member secured thereto and extending in both outward and lateral directions beyond the width of the same, said subsidiary tubes being connected at their respective lower end portions to the opposite outer ends of the shaft member so as to extend upwardly therefrom having space therebetween substantially equal to the lateral width of the shaft member.

Also within the scope of the invention is a body constructed into a diamond frame type having an internal combustion engine as a constructional component. The main body is so formed that a downtube on its front side and a backborn frame extends rearward therefrom and interconnected through a crank case portion of the engine. A rear fender on its front portion an air cleaner casing formed integrally therewith is put in the space formed between the two subsidiary tubes and is assembled to a subsidiary frame provided behind a main body. A subsidiary frame extends rearwards from the subsidiary tubes and the rear fender is supported thereby.

IN THE DRAWINGS

FIG. 3 is a top plan view of FIG. 2;

FIGS. 4, 5, 6 are sectional views taken along the lines IV—IV, V—V and VI—VI in FIG. 2;

FIG. 7 is a sectional side view of an air cleaner assembly section thereof, and

FIG. 8 is a top plan view, partly omitted, of FIG. 7.

PREFERRED EMBODIMENT

Figure 1:
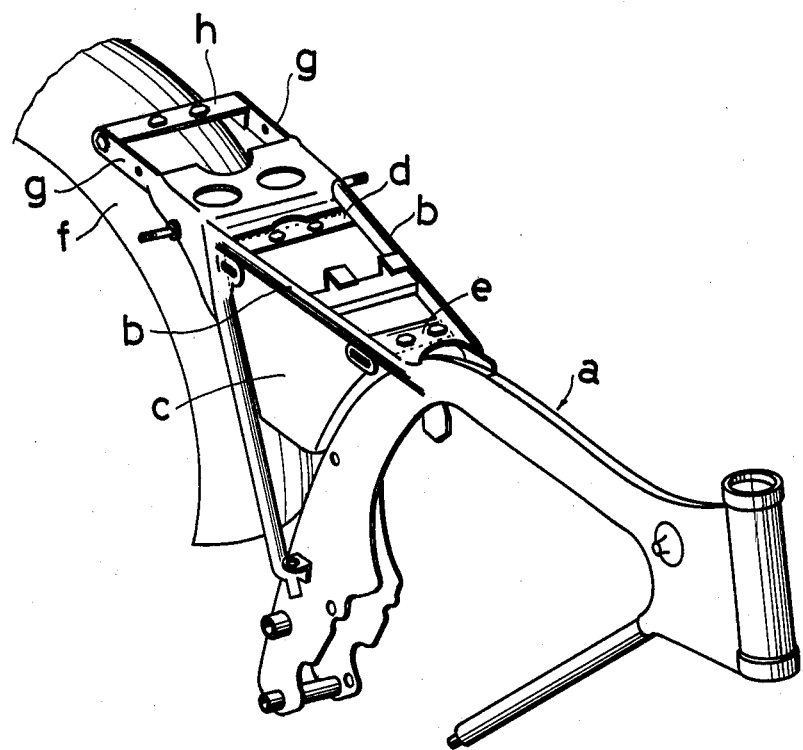
FIG. 1 illustrates a conventional prior art arrangement.
Figure 2:
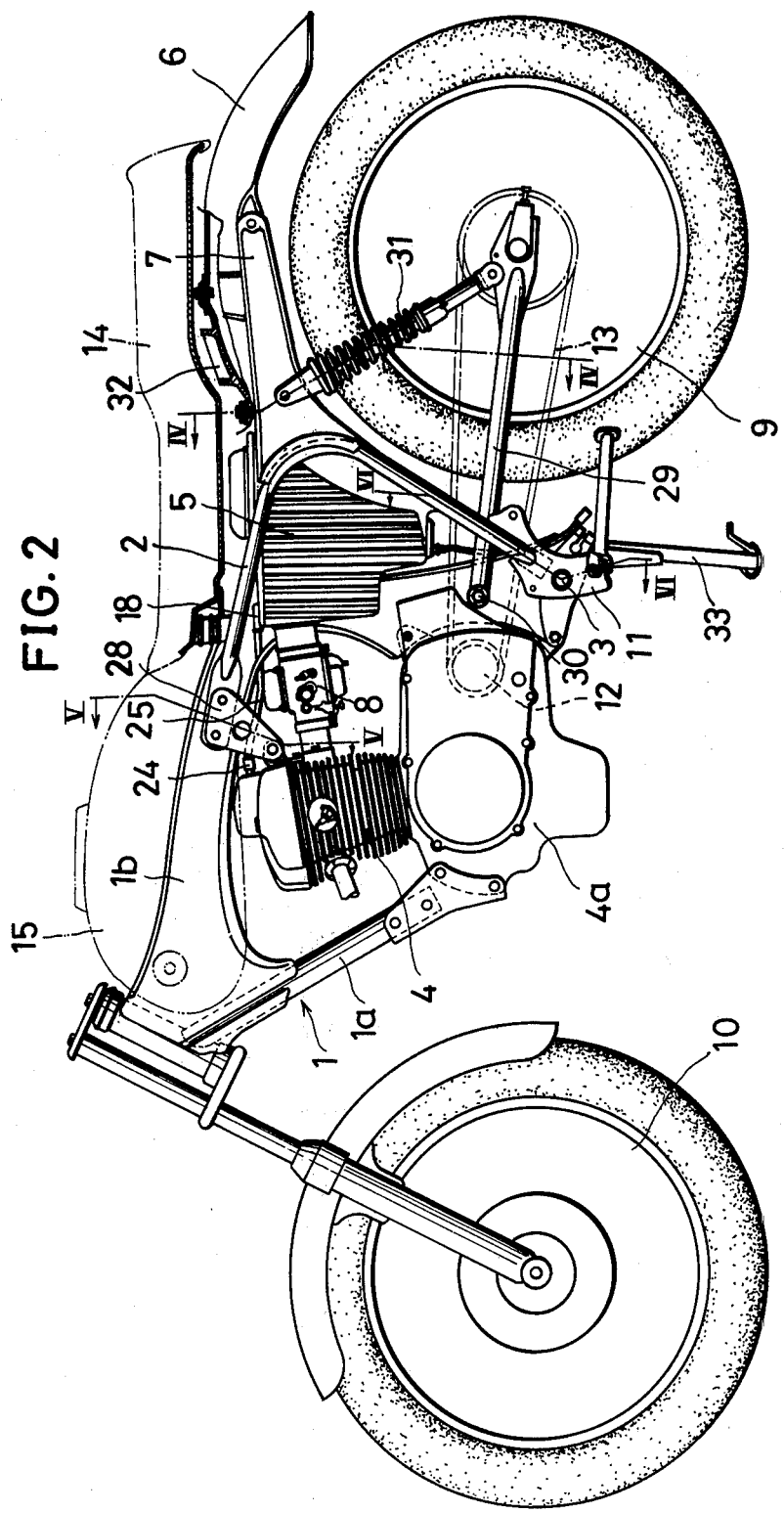
FIG. 2 is a side view, partly in section of a motorcycle employing the present invention.

In the prior art, as shown in FIG. 1, an air cleaner c is provided within a space formed by the main frame a and the sub-tubes b,b and is secured to cross members d,e extending between the sub-tubes b,b, by means of bolts. A rear fender f is provided on the rear side thereof an d is secured by means of bolts to a cross member h extending between two arms g,g projecting rearwards from the two tubes b,b.

Thus, the space between the tubes b, b is comparatively small in width and the air cleaner c is provided therein, so that the air cleaner c becomes comparatively small in capacity.

The inventive apparatus is directed to a pair of carburetors 8,8 provided in front of the air cleaner casing 5, a rear wheel 9 on the lower side of the rear fender 6, a front wheel 10 and a bracket 11 extending downward from the lower end of the subsidiary tube 2 on one side. As shown in FIG. 6, the lower end of each tube 2 is formed into a flat shaped plate and is mounted at an opening made therein on the shaft member 3 and is secured thereto by welding. In this case, the lower end of the tube 2 on one side is composed of the bracket 11 secured thereto. As shown also in the same Figure, the shaft member 3 is inserted through openings made in both side walls of the backborn frame 1b and secured thereto by welding. A driving chain 13 extending between an output shaft 12 of the engine 4 and the rear wheel 9 is arranged to be on the inner side of the subsidiary tube 2 on one side. A driver's seat provided above the subsidiary frame 7 and a fuel tank 15 is provided on the front side thereof.

The upper end of each tube 2 is formed into a flat shaped plate and is on the side surface of the main body 1 and secured thereto by welding or by screws.

Referring to the drawings, there is shown an engine mounting bracket 28, a swing arm 29 for carrying the rear wheel 9, a pivot shaft 30 for the same, a rear damper 31, a tool box 32 formed on the rear fender 6. A main stand 33 is provided below the shaft member 3, and a stopper 34 for the same is secured to the shaft member 3.

Thus, according to the invention, the vehicle frame main body 1 has a shaft member 3 which is larger in its lateral width than the same, and subsidiary tubes 2,2 are secured at their lower ends to the outer ends of the shaft member 3 to extend upward therefrom with a space having a width substantially equal to that of the member 3. As a result, space which is comparatively large in width can be obtained between the two tubes 2,2 and thus the assembling of the rear fender 6 having the air cleaner casing 5 integral therewith and other working can be facilitated, and it becomes easy and simple to accommodate therein various part 5 such as the air cleaner casing, and the whole of the vehicle body having comparatively large rigidity can be obtained.

The air cleaner casing 5 and the rear fender 6 are previously formed integrally one with another by injection molding of synthetic resin or the like and are positioned within the space formed between the two subsidiary tubes 2,2 as mentioned before. The casing 5 is formed with a top surface having an upper opening 16, and a cover member 19 having at least one air intake opening 17 on its upper portion which is in communication with the external air and on its lower side, an air cleaner element 18 is detachably applied to the opening 16 of the casing 5. Thus the ease of attaching and maintenance of the air cleaner element 18 is improved.

In illustrated embodiment, the covering member 19 and the opening 16 are mounted one another at a peripheral ridge 20 provided on one of them and at a peripheral groove 21 made in the other, both combined together by means of screws 22. Additionally, the covering member 19 is composed of an upper half portion 19a and a lower half portion 19b previously prepared separately and assembled together. A pair of the air intake openings 17,17 each of which is formed on the upper half portion 19a into a curved tubular arrangement, and the air cleaner element 18 is detachably carried on the bottom surface of the lower half portion 19b. Additionally, a treatment device 23 for blow-bye gas is contained in a space formed within the casing 5. It is so arranged, that the blow-bye gas discharged from a discharge opening 24 made in a cylinder head cover of the engine 4 is led, through a pipe 25 connected thereto, and to an inlet opening 26 made on the upper portion of the device 23. The same is passed in the space formed within the casing 5 through an outlet opening 28 after the water content thereof is removed within a breather casing 27 provided on the lower side of the device 23.

Thus, according to this feature of this invention, the air cleaner casing 5 is so formed on the front portion of the rear fender 6 as to be integral therewith, and the casing 5 can be simply made to have a comparatively large capacity. Additionally, the covering member 19 having the air cleaner element 18 is detachably applied to the upper opening 16 of the casing 15, so that the attaching of the element 18 and the maintenance such as of inspection and others of the element 18, can be carried out very simply and easily by attaching and detaching of the covering member 19.

Many modifications and variations of the present invention are possible in light of the above teachings. It is, therefore, to be understood that within the scope of the appended claims, the invention may be practiced otherwise than as particularly described.

What we claim is:

1. In a motorized two-wheeled vehicle, the combination including:

a main frame providing a support for an internal combustion engine of said vehicle;

shaft means rigidly secured to said main frame at a lower portion thereof and which extends outwardly of said main frame in both lateral directions;

a pair of subsidiary tubes respectively rigidly attached at one of their ends to opposite sides of the main frame member at an upper portion thereof, and which extend outwardly of the main frame and then rearwardly of the main frame and then in a downward direction, the other of the ends of the subsidiary tubes being rigidly attached to said shaft means at positions spaced outwardly of said main frame;

an air cleaner casing positioned between the rearwardly extending portions of the subsidiary tubes and rigidly attached thereto, said casing having an opening in an upper side thereof;

a cover detachably attached to the outer periphery of said casing and which is defined by an upper half portion and a lower half portion formed as a unit, the upper half portion having an air intake opening on its upper surface in communication with atmosphere, and the lower half portion having an air cleaner element detachably carried on the bottom surface thereof; and a rear fender integral with said casing and having a front wall constituted by a rear wall of said casing.

* * * * *